(12) United States Patent
Holzapfel

(10) Patent No.: US 9,310,183 B2
(45) Date of Patent: Apr. 12, 2016

(54) MEASURING DEVICE FOR HIGH-PRECISION OPTICAL DETERMINATION OF DISTANCE OR POSITION

(71) Applicant: DR. JOHANNES HEIDENHAIN GMBH, Traunreut (DE)

(72) Inventor: Wolfgang Holzapfel, Obing (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 65 days.

(21) Appl. No.: 14/285,133

(22) Filed: May 22, 2014

(65) Prior Publication Data

US 2015/0022820 A1    Jan. 22, 2015

(30) Foreign Application Priority Data

Jun. 13, 2013    (DE) .................. 10 2013 210 999

(51) Int. Cl.
*G01B 9/02*        (2006.01)
*G01B 11/14*       (2006.01)

(52) U.S. Cl.
CPC ........ *G01B 9/02041* (2013.01); *G01B 9/02018* (2013.01); *G01B 9/02019* (2013.01); *G01B 9/02061* (2013.01); *G01B 11/14* (2013.01)

(58) Field of Classification Search
CPC ........... G01B 9/02017; G01B 9/02018; G01B 9/02019; G01B 9/02041; G01B 9/02056; G01B 9/02061
See application file for complete search history.

(56) References Cited

U.S. PATENT DOCUMENTS

| 3,864,044 A * | 2/1975 | Lyshkow ............. G01N 21/534 250/573 |
| 4,693,605 A | 9/1987 | Sommargren |
| 5,064,289 A | 11/1991 | Bockman |
| 6,791,693 B2 * | 9/2004 | Hill ..................... G01B 9/02019 356/500 |
| 2003/0048456 A1 * | 3/2003 | Hill ..................... G03F 7/70775 356/500 |
| 2003/0053073 A1 | 3/2003 | Hill |
| 2004/0047027 A1 | 3/2004 | Carlson |
| 2004/0090636 A1 * | 5/2004 | Holzapfel ................ G01D 5/26 356/499 |
| 2004/0136006 A1 * | 7/2004 | Abbink ............. G01B 9/02061 356/451 |

OTHER PUBLICATIONS

European Search Report, dated Oct. 31, 2014, issued in corresponding European Patent Application No. 14169847.2.

* cited by examiner

*Primary Examiner* — Michael A Lyons
(74) *Attorney, Agent, or Firm* — Kenyon & Kenyon LLP

(57) ABSTRACT

A measuring device for the high-precision optical determination of distance or position includes a light source, at least one optical functional element in the form of a plane mirror or a measuring standard, and a detector system. At least two sub-beams are generated, of which at least one impinges on the functional element at least three times before the sub-beams propagate, interferingly superposed, in the direction of the detector system, via which at least one phase-encoded measuring signal is able to be generated from the superposed sub-beams. Between the impingements on the optical functional element, the sub-beam passes through at least two imaging elements, the imaging elements having imaging factors such that no location and directional shear of the interfering sub-beams results in the event the optical functional element tilts out of its setpoint position.

16 Claims, 11 Drawing Sheets

RELATED ART

Fig. 12
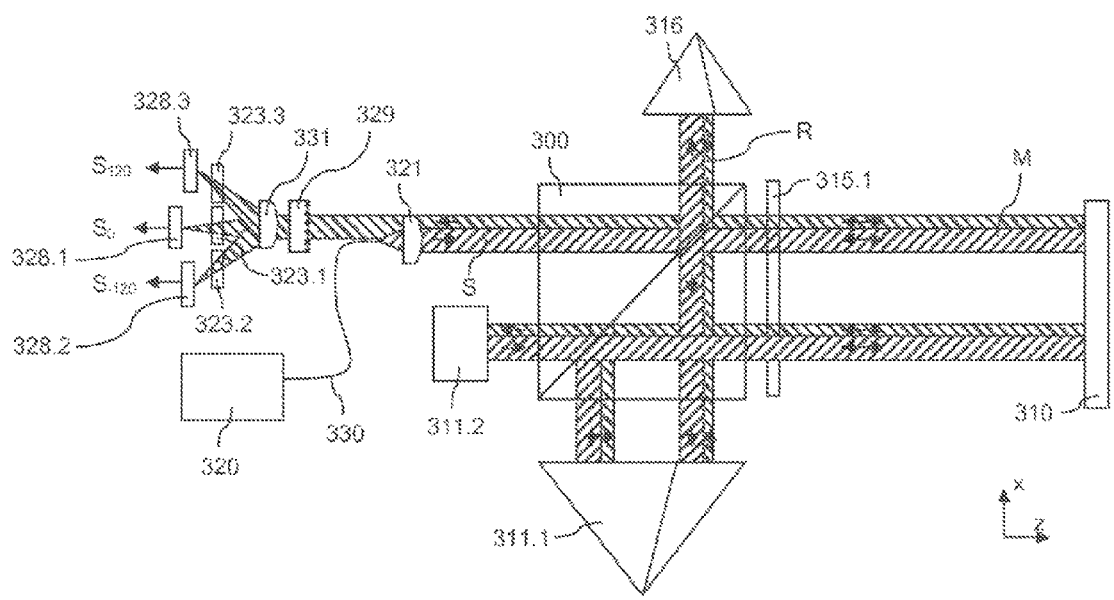
Fig. 13a                    Fig. 13b
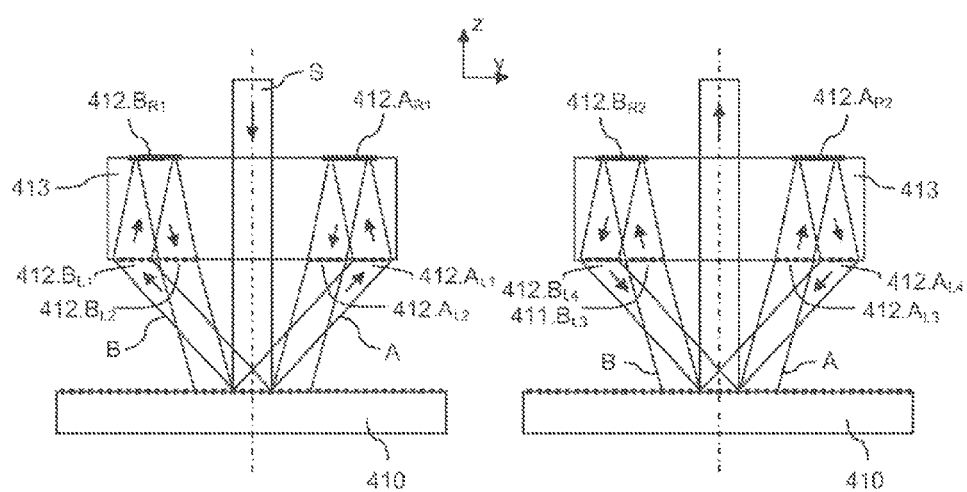

Fig. 14
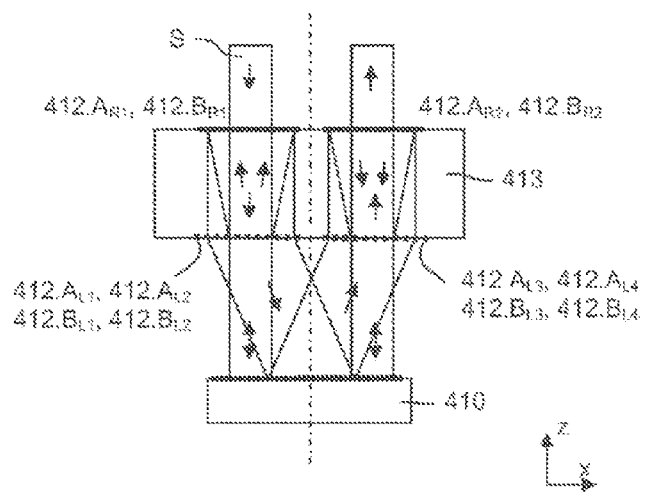
Fig. 15a
Fig. 15b
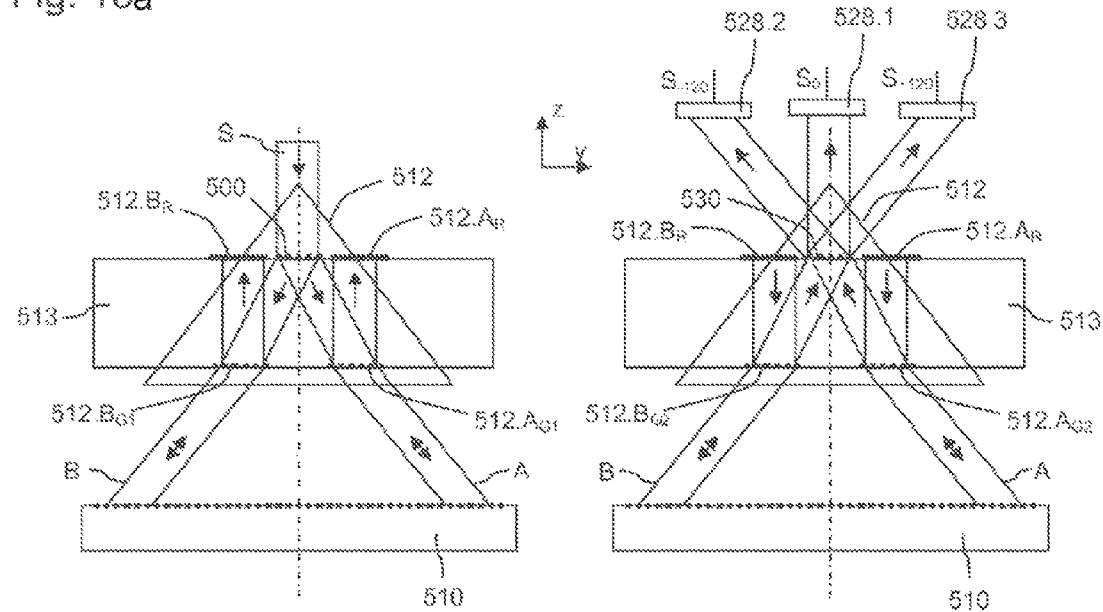

MEASURING DEVICE FOR HIGH-PRECISION OPTICAL DETERMINATION OF DISTANCE OR POSITION

FIELD OF THE INVENTION

The present application claims priority to Application No. 10 2013 210 999.7, filed in the Federal Republic of Germany on Jun. 13, 2013, which is expressly incorporated herein in its entirety by reference thereto.

FIELD OF THE INVENTION

The present invention relates to measuring devices which are suitable for the high-precision optical determination of distance or position.

BACKGROUND INFORMATION

Various types of measuring devices are used for the high-precision optical determination of distance or position. First of all, interferometers without physically formed measuring standards are used for determining distance; secondly, interferential position-measuring devices having physically formed measuring standards are used for determining position.

In the case of measuring devices in the form of interferometers, problems are discussed in the following that occur particularly in connection with familiar plane-mirror interferometers. Such plane-mirror interferometers are described, for example, in U.S. Pat. No. 4,693,605 and U.S. Pat. No. 5,064,289. FIG. 1a schematically illustrates a conventional a plane-mirror interferometer.

Beam of rays S emitted by a light source—not shown in FIG. 1a—is split, for example, via a splitting element ST in the form of a polarization-optical beam splitter into two sub-beams. The two sub-beams are a measuring beam M and a reference beam R. Measuring beam M is then reflected by an optical functional element, which in the present case is in the form of a measuring reflector or plane mirror P, and directed via splitting element ST to a measuring retroreflector MR. For example, the retroreflector may take the form of a triple prism or triple mirror. Measuring retroreflector MR deflects measuring beam M exactly the opposite direction, back to plane mirror P again. There, measuring beam M is reflected again before it propagates back in the direction of splitting element ST, where it comes to interfering superposition with reference beam R which was deflected beforehand via a reference retroreflector RR. Downstream of splitting element ST on the output side is a detector system—also not shown in FIG. 1a. A phase-encoded measuring signal is able to be generated from the superposed sub-beams via the detector system, the measuring signal representing a measure for the distance of plane mirror P from the remaining components of the interferometer.

Even if, according to FIG. 1b, plane mirror P is tilted slightly by an angle α relative to its setpoint position, after the second reflection at plane mirror P, measuring beam M extends exactly anti-parallel to originally incident beam of rays S prior to the first reflection at plane mirror P. In this manner, measuring beam M may subsequently be superposed with reference beam R in beam splitter ST, without an angle shear or directional shear occurring. However, measuring beam M is shifted laterally by a small tilting of plane mirror P, so that after being recombined, the measuring beam and the reference beam are no longer superposed over the entire beam cross-section, i.e., a location shear results with regard to the beams of rays involved in the signal generation. Therefore, the interference occurs only in the reduced overlapping region, as a consequence of which, the resulting amplitude or the degree of modulation of the phase-encoded measuring signals generated in this manner is reduced.

Therefore, a minimum cross-section of beam of rays S must be provided for a predefined tilt tolerance of plane mirror P, in order to limit the signal drop caused in such a manner. This relationship is described for a Gaussian beam of rays S, which is emitted by a light source in the form of a laser, by the following equations (1a) and (1b), respectively:

$$\eta = e^{-8 \cdot \left(\frac{L_{Max} \cdot \alpha_{Max}}{w}\right)^2} \quad \text{(equation 1a)}$$

and $$w = \frac{2\sqrt{2} \cdot L_{Max} \cdot \alpha_{Max}}{\sqrt{\ln(\eta^{-1})}} \quad \text{(equation 1b)}$$

in which $L_{Max}$ represents the maximum distance of the plane mirror from the measuring retroreflector, $\alpha_{Max}$ represents the maximum tilt angle of the plane mirror, w represents $1/e^2$-beam cross-section of the beam of rays, η represents the minimum permissible signal level relative to the signal level, when the plane mirror is not tilted.

With $L_{Max}$=2m, $\alpha_{Max}$=1 mrad and η=0.7 (signal drop to 70%), a minimum beam cross-section w of beam of rays S according to w=9.5 mm is obtained. Since the wavefront of beam of rays S must be very even over the beam cross-section (typical requirement: λ/10), correspondingly complicated and costly collimating optics are needed to collimate beam of rays S, without a considerable signal drop being absolutely unavoidable. Such a signal drop leads to a decrease in accuracy in the determination of distance by the interferometer, and to an increased signal noise in the measuring signals generated. Furthermore, the small tilt tolerance of plane mirror P is naturally also annoying if one takes into account that it includes both the assembly tolerance and the operating tolerance.

Similar problems also result in the case of the interferential position-measuring devices mentioned above, having physically formed measuring standards. The tilting of optical functional elements in the scanning beam path out of their setpoint position affect the generated measuring signals negatively, as well. The corresponding position-measuring devices usually include a measuring standard as an optical functional element. Relatively movable to this along at least one measuring direction, a scanning unit is provided having various further optical components such as a light source, a splitting element, a retroreflector, and a detector system. Such position-measuring devices react particularly sensitively to tilts of the scanning unit and/or measuring standard about a normal to the measuring standard. Such a tilt is also referred to as moiré tilting. Because of the retroreflectors frequently provided in these devices on the part of the scanning unit, an angle shear or directional shear of the interfering sub-beams is able to be minimized, however, a location shear of the split sub-beams remains, which limits the maximum permissible moiré tilt angle. Consequently, the maximum permissible moiré tilt angle is usually markedly less for this type of measuring devices than the maximum permissible tilt angles about the two remaining tilt axes, e.g., about the "longitudinal axis" and the "horizontal axis."

SUMMARY

Example embodiments of the present invention provide a measuring device for the high-precision optical determination of distance or position, which is as insensitive as possible to tiltings of optical functional elements. In the case of plane-mirror interferometers, one aspect is that tilting of the plane mirror will cause neither a directional nor a location shear of the measuring beam. In interferential position-measuring devices having physically formed measuring standards, one aspect in the case of moiré tilting of the measuring standard is that no directional or location shears occur, in order to ensure the highest possible tilt tolerances about all tilt axes.

According to an example embodiment of the present invention, a measuring device for high-precision optical determination of distance or position includes a light source, at least one optical functional element in the form of a plane mirror, and a detector system. At least two sub-beams are generated, of which at least one impinges on the functional element at least three times before the sub-beams propagate, interferingly superposed, in the direction of the detector system, via which at least one phase-encoded measuring signal is able to be generated from the superposed sub-beams. Between the impingements on the optical functional element, the sub-beam traverses at least two imaging elements, the imaging elements having imaging factors such that no location and directional shear of the interfering sub-beams results in the event the optical functional element tilts out of its setpoint position, and the imaging elements being arranged such that the emergent sub-beams are thereby displaced relative to the incident beams of rays.

According to an example embodiment of the present invention, a measuring device for high-precision optical determination of distance or position includes a light source, at least one optical functional element in the form of a measuring standard, and a detector system. At least two sub-beams are generated, of which at least one impinges on the functional element at least three times before the sub-beams propagate, interferingly superposed, in the direction of the detector system, via which at least one phase-encoded measuring signal is able to be generated from the superposed sub-beams. Between the impingements on the optical functional element, the sub-beam passes through at least two imaging elements, the imaging elements having imaging factors such that no location and directional shear of the interfering sub-beams results in the event the optical functional element tilts out of its setpoint position.

The following conditions may be satisfied for imaging factors $m_n$ of the N imaging elements:

a) N=2: $m_1=-2$, $m_2=-\frac{1}{2}$
b) N=3: imaging elements having positive imaging factors $m_n$ and imaging elements having negative imaging factors $m_n$ are provided in which:
n:=1 ... N
N:=2, 3; number of imaging elements
$m_n$:=imaging factor of the nth imaging element The imaging elements may be formed as a combination of at least one lens and one mirror.

The at least one lens may be a diffractive lens.

The imaging element may also include two lenses that have different focal lengths and are arranged such that a collimated sub-beam falling on the first lens, after passing through the second lens, further propagates again in collimated fashion.

In addition, it is possible that the split into two sub-beams is accomplished via a splitting element or via the light source.

The interferingly superposed sub-beams may be transmitted to the downstream detector system via one or more optical fibers.

The plane mirror may be arranged in the measuring arm of an interferometer and may be impinged upon by a measuring beam at least three times.

In such an arrangement, the interferometer may include two imaging elements which have the imaging factors $m_1=-2$ and $m_2=-\frac{1}{2}$.

Moreover, in such an arrangement of the measuring device, the interferometer may include three imaging elements, the first and the third imaging element in each case taking the form of a triple prism having imaging factors $m_1=m_3=-1$, and the second imaging element taking the form of a beam-displacing reflecting prism or a grating-mirror-grating combination having the imaging factor $m_2=+1$.

Moreover, it may be provided that the measuring beam falls perpendicularly onto the plane mirror.

It is also possible to form the imaging elements such that the emergent sub-beams are thereby displaced relative to the incident sub-beams.

An important aspect of the arrangements described herein is that tilt tolerances for optical functional elements are improved. The attachment or mounting of the measuring devices described herein is thereby considerably easier.

Additionally, despite the high tilt tolerances, no signal breakdown results in the measuring signals generated. The accuracy of the measuring signals is consistently high, and their position jitter is low.

In addition, in the case of measuring devices in the form of interferometers, the beam cross-section of the beam of rays emitted by the light source may be selected to be substantially smaller than in conventional systems. The necessary collimating optics may be correspondingly more compact and therefore less costly.

Further features and aspects of example embodiments of the present invention are described in more detail below with reference to the appended Figures.

BRIEF DESCRIPTION OF THE DRAWING

FIG. 12 schematically illustrates a complete beam path in a measuring device according to an example embodiment of the present invention in the form of a plane-mirror interferometer, in the xz plane.

FIGS. 13a and 13b schematically illustrate a partial scanning beam path in a measuring device according to an example embodiment of the present invention in the form of an interferential position-measuring device with a measuring standard.

FIG. 14 is another view of the scanning beam path of the position measuring device illustrated in FIGS. 13a and 13b.

FIGS. 15a and 15b schematically illustrate a partial scanning beam path in a measuring device according to an example embodiment of the present invention in the form of an interferential position-measuring device with a measuring standard.

DETAILED DESCRIPTION

Before the measuring devices according to example embodiments of the present invention are described in more detail below with reference to FIGS. 9a to 16, first of all, basic theoretical aspects are explained. First, measuring devices are discussed which take the form of interferometers, and next, measuring devices in the form of interferential position-measuring devices having measuring standards.

Interferometer

Figure 1A:
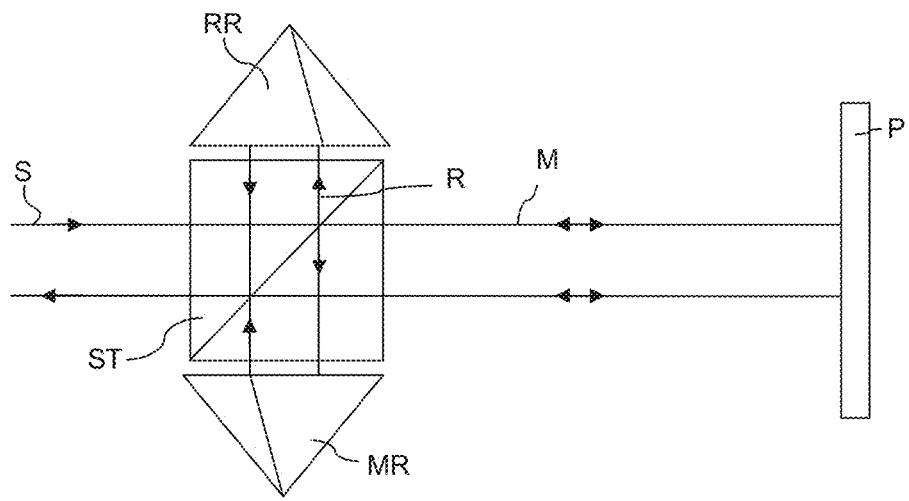
FIG. 1a shows the beam path in a conventional measuring device taking the form of a plane-mirror interferometer.
Figure 1B:
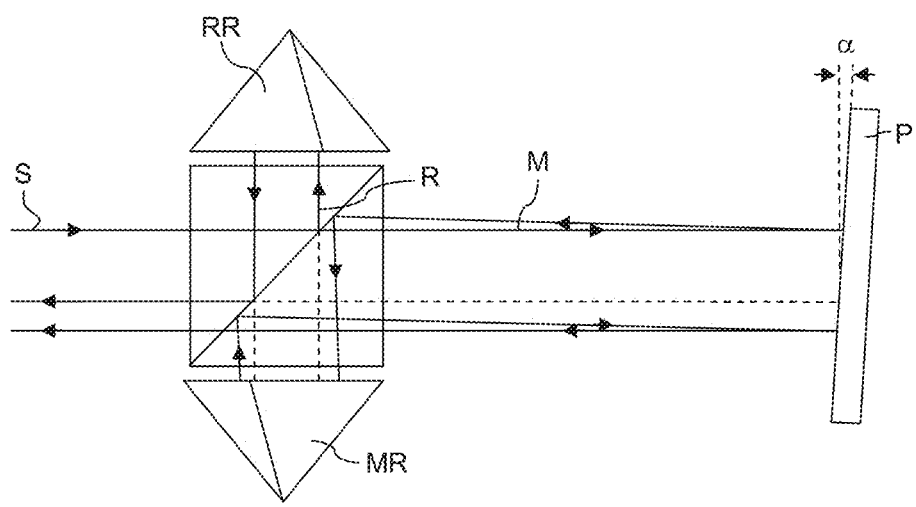
FIG. 1b shows the beam path in the measuring device of FIG. 1a when the plane mirror is tilted.
Figure 2:
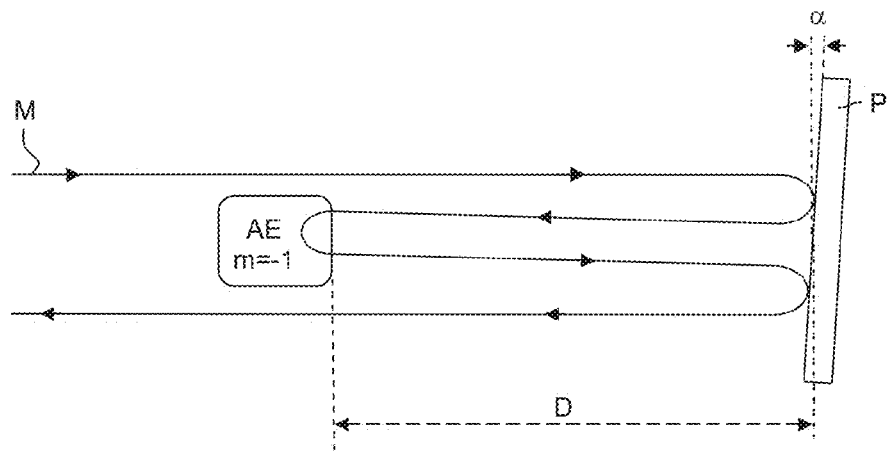
FIG. 2 schematically illustrates the beam path of the measuring beam in a conventional measuring device in the form of a plane-mirror interferometer.

In the plane-mirror interferometers discussed above, usually at least one retroreflector is provided in the measuring arm. A retroreflector may be provided in an interferometer in many different manners, for example, as a triple mirror, triple prism, or as a combination of a lens with a mirror that is located in the focal plane of the lens. All these retroreflector variants bring about an anti-parallel back-reflection of a beam of rays falling on them. From the retroreflector variant with lens and mirror, it is understandable that in principle, retroreflectors may be regarded as optical imaging elements having the imaging factor m=-1, whose object plane and image plane in each case are located in infinity. Due to the position of the object and image planes in infinity, collimated beams of rays are converted into collimated beams of rays again. A schematic view of the beam path of a sub-beam resulting from a beam splitting in an interferometer, or more precisely, in a plane-mirror interferometer, in a conventional system may therefore be arranged according to FIG. 2. FIG. 2 shows the beam path of measuring beam M which results from a suitable splitting. In the measuring arm of the interferometer, measuring beam M impinges on an optical functional element in the form of a measuring reflector or plane mirror P, is reflected by it and propagates over distance D back to imaging element AE having imaging factor m=-1, strikes plane mirror P again, and after being reflected once more, then propagates back in a manner anti-parallel to originally incident measuring beam M.

Figure 3:
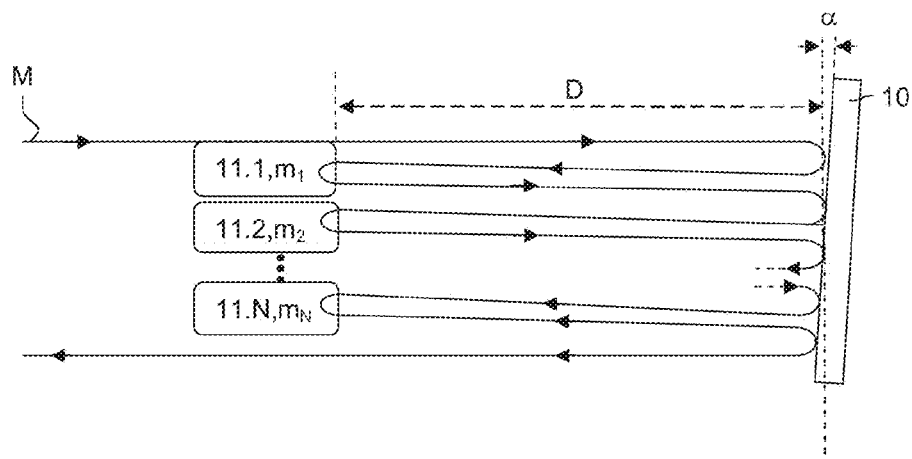
FIG. 3 schematically illustrates a beam path of a measuring beam in a measuring device according to an example embodiment of the present invention in the form of a plane-mirror interferometer.

In the correspondingly designed arrangement of the measuring device according to the schematic beam-path illustrated in FIG. 3, at least three reflections of measuring beam M, propagating in the measuring arm, at functional element 10 or the plane mirror are provided in example embodiments of the present invention. Between successive reflections, in each case measuring beam M passes through an imaging element 11.n (n=1, 2, ... N) having imaging factor $m_n$, which in each instance directs measuring beam M back to functional element 10. Therefore, in the case of an impingement on functional element 10 a total of three times, N=2 imaging elements 11.1, 11.2 are provided which are traversed between the impingements on functional element 10. This means that a first imaging element 11.1 is traversed between the first and second impingement on functional element 10, and a second imaging element 11.2 is traversed between the second and third impingement on functional element 10.

Optimal imaging factors $m_n$ of imaging elements 11.n utilized may be calculated or determined with the aid of ray-tracing methods, in doing which, one may limit oneself to two dimensions (x, z) perpendicular to a tilt axis of the plane mirror of functional element 10. Each segment of the beam path of measuring beam M is described by a suitably simplified ray vector $\vec{s}$:

$$\vec{s} = \begin{pmatrix} x \\ kx \end{pmatrix} \quad \text{(equation 2)}$$

in which x represents the beam location, and kx represents the x-component of the k vector.

Incident measuring beam M, represented as $$\vec{s}_0 = \begin{pmatrix} 0 \\ 0 \end{pmatrix},$$

is deviated at tilted plane mirror or functional element 10 ($k_0 = 2\pi/\lambda$). The resulting measuring beam M may be represented as:

$$\vec{s}_1 = \vec{s}_0 + \begin{pmatrix} 0 \\ 2 \cdot \alpha \cdot k_0 \end{pmatrix} \quad \text{(equation 3)}$$

Following this, measuring beam M then propagates over distance D to first imaging element 11.1, which is described by a matrix multiplication:

$$\vec{s}_2 = \begin{pmatrix} 1 & \dfrac{D}{k_0} \\ 0 & 1 \end{pmatrix} \cdot \vec{s}_1 \quad \text{(equation 4)}$$

Imaging element 11.1 is described by a matrix multiplication, in doing which, care must be taken that imaging factor $m_1$ for the beam location and that for the kx component are inverse relative to each other:

$$\vec{s}_3 = \begin{pmatrix} m_1 & 0 \\ 0 & \frac{1}{m_1} \end{pmatrix} \cdot \vec{s}_2 \quad \text{(equation 5)}$$

Following that, measuring beam M propagates back again to functional element 10:

$$\vec{s}_4 = \begin{pmatrix} 1 & \frac{D}{k_0} \\ 0 & 1 \end{pmatrix} \cdot \vec{s}_3 \quad \text{(equation 6)}$$

The further beam path according to FIG. 3, having a total of N+1 reflections taking place at functional element 10, is described by further transformations analogous to equations 3 to 6, so that equations 3 to 6 are applied a total of N times (in each case with different imaging factors $m_n$):

$$\vec{s}_5 = \vec{s}_4 + \begin{pmatrix} 0 \\ 2 \cdot \alpha \cdot k_0 \end{pmatrix}, \quad \text{(equation 7)}$$

$$\vec{s}_6 = \begin{pmatrix} 1 & \frac{D}{k_0} \\ 0 & 1 \end{pmatrix} \cdot \vec{s}_5,$$

$$\vec{s}_7 = \begin{pmatrix} m_2 & 0 \\ 0 & \frac{1}{m_2} \end{pmatrix} \cdot \vec{s}_6,$$

$$\vec{s}_8 = \begin{pmatrix} 1 & \frac{D}{k_0} \\ 0 & 1 \end{pmatrix} \cdot \vec{s}_7$$

After an (N+1)th reflection at functional element 10, ray vector $\vec{s}_{4N-3}$ is intended to be anti-parallel to $\vec{s}_0$ and to impinge at the same, i.e., unshifted location. Consequently, the following must apply:

$$\vec{s}_{4N-3} = \vec{s}_0 = \begin{pmatrix} 0 \\ 0 \end{pmatrix} \quad \text{(equation 8)}$$

For the case with three reflections taking place at functional element 10 and N=2 imaging elements 11.1, 11.2 provided, it follows that:

$$\begin{pmatrix} 2 \cdot \alpha \cdot D \cdot \frac{1 + m_1 + 2m_2^2 + m_1 m_2^2 + m_1^2 m_2^2}{m_1 m_2} \\ 2 \cdot \alpha \cdot k_0 \cdot \frac{1 + m_1 + m_1 m_2}{m_1 m_2} \end{pmatrix} = \begin{pmatrix} 0 \\ 0 \end{pmatrix} \quad \text{(equation 9)}$$

The only real solution of equation (9) results for the following values of imaging factors $m_1$, $m_2$ of the two imaging elements 11.1, 11.2:

$$m_1 = -2, m_2 = -\tfrac{1}{2} \quad \text{(equation 10)}$$

Figure 5:
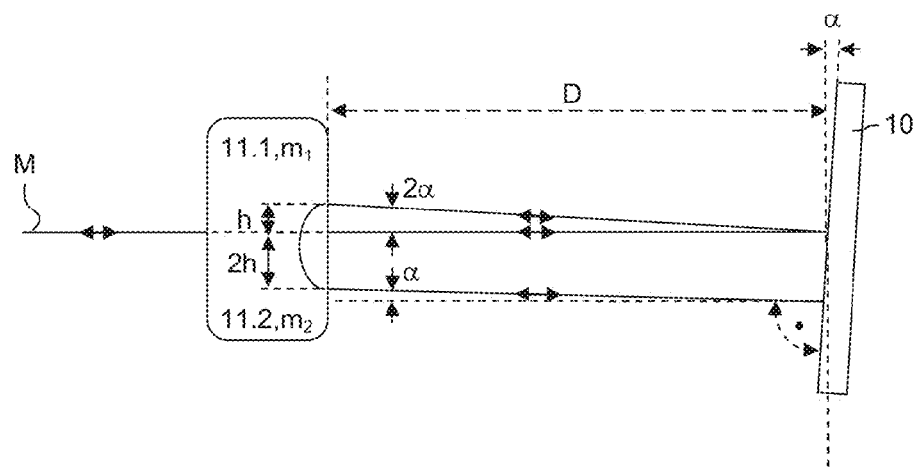
FIG. 5 schematically illustrates a beam path of a measuring beam in a measuring device according to an example embodiment of the present invention in the form of a plane-mirror interferometer, having N=2 imaging elements and $m_1=-2$, $m_2=-\frac{1}{2}$.

The corresponding beam path is illustrated in FIG. 5. A functional element 10, which is tilted by angle $\alpha$, deflects incident measuring beam M by angle $2\alpha$. This angle is imaged by an imaging element 11.1 having imaging factor $m_1 = -2$. Lateral beam displacement h is thereby converted into a displacement $-2h$, and corresponding to incident beam angle $2\alpha$, into an emergent beam angle $\alpha$, Emergent measuring beam M consequently propagates perpendicularly to the plane mirror or functional element 10 and is mirrored back by it upon itself. Measuring beam M is imaged by imaging element 11.2 having imaging factor $m_2 = -\tfrac{1}{2}$, which corresponds to imaging element 11.1 traversed in the opposite direction. After reflection once more at functional element 10, measuring beam M thus emerges again anti-parallel to and without beam displacement relative to incident measuring beam M, that is, despite the tilting of functional element 10, neither a directional nor a location shear of measuring beam M results.

In the following, the case with N=3 imaging elements 11.1, 11.2, 11.3 and four reflections of measuring beam M at the plane mirror of functional element 10 will be discussed. For this case, there are endless solutions for the possible imaging factors $m_1$, $m_2$, $m_3$ of imaging elements 11.1, 11.2, 11.3, e.g., combinations of $m_1$, $m_2$ and $m_3$ for which neither a location nor a directional shear of the interfering sub-beams, i.e., measuring and reference beams, occurs.

Figure 4:
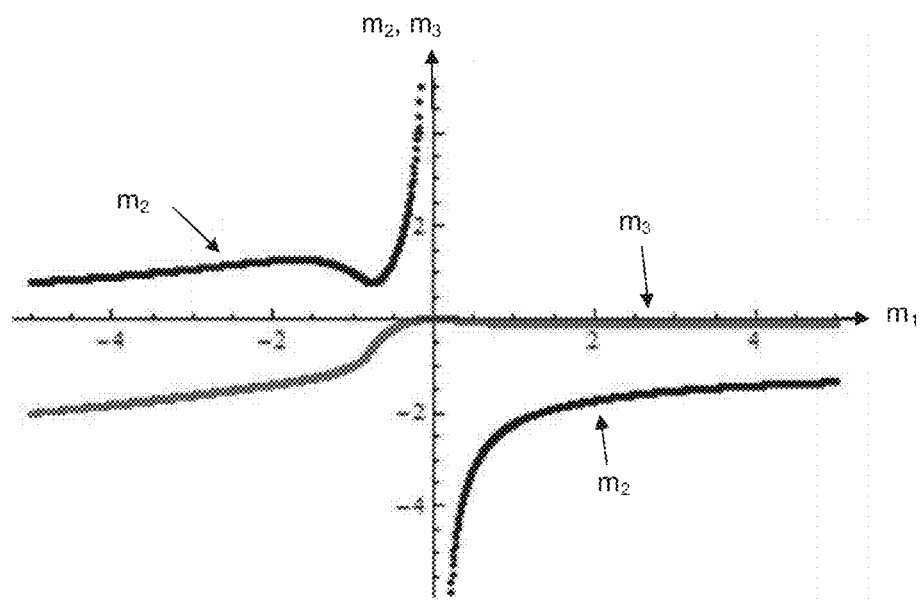
FIG. 4 is a graph illustrating solutions for imaging factors in the case of three imaging elements used.

The solutions for $m_2$ and $m_3$ as a function of $m_1$ are illustrated in FIG. 4 for the range $m_1 = -5 \ldots +5$. Favorable imaging factors $m_n$ for the imaging elements are in the ranges $m_n = -3 \ldots -\tfrac{1}{3}$ and $m_n = +\tfrac{1}{3} \ldots +3$, respectively. Outside of these ranges, the beam cross-sections of measuring beam M become too large or too small. Within these ranges, it is possible to find the following conditions for imaging factors $m_n$:

$$\begin{cases} 0.8 \leq m_2 \leq 1.3 \\ m_1, m_3 \geq -m_2 \text{ for } m_2 \leq 1 \\ m_1, m_3 \leq -m_2 \text{ for } m_2 \geq 1 \end{cases} \quad \text{(equation 11)}$$

In general, the possible solutions in the case of N=3 imaging elements as well as for the case with N>3 imaging elements may be described in simplified terms due to the fact that both positive and negative imaging factors $m_n$ of the imaging elements occur. In other words, both imaging elements with positive imaging factors and imaging elements with negative imaging factors are provided.

Only one of these solutions for N=3 imaging elements $m_n$ is symmetrical, that is, it satisfies the condition $m_1 = m_3$. This symmetrical solution reads:

$$m_1 = m_2 = -1, m_2 = +1 \quad \text{(equation 12)}$$

Figure 6:
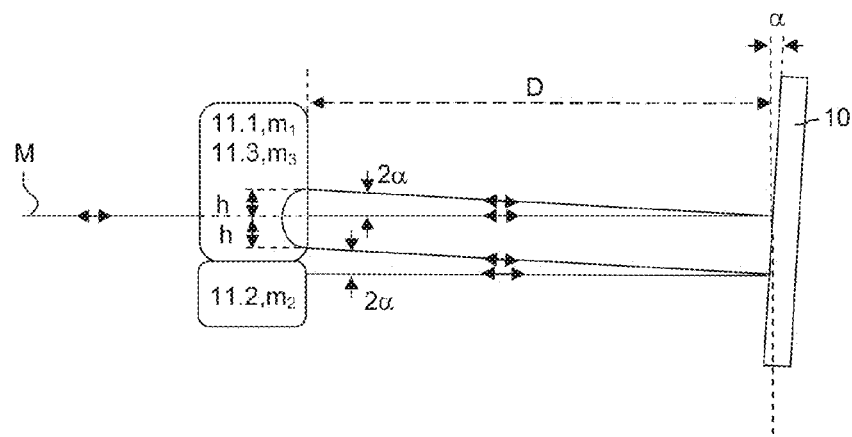
FIG. 6 schematically illustrates a beam path of a measuring beam in a measuring device according to an example embodiment of the present invention in the form of a plane-mirror interferometer, having N=3 imaging elements and $m_1=m_3=-1$, $m_2=+1$.

This solution is illustrated schematically in FIG. 6. Upon a first reflection at functional element 10, which is tilted by an angle $\alpha$, measuring beam M is deflected by angle $2\alpha$. The imaging by a first imaging element 11.1 having imaging factor $m_1 = -1$ means a retroreflection of measuring beam M, so that the beam angle again amounts to $2\alpha$. A second reflection at functional element 10 supplies a measuring beam M whose beam direction is anti-parallel to incident measuring beam M, but which is displaced in the beam location as a function of tilt angle $\alpha$. A second imaging element 11.2 having imaging factor $m_2 = +1$, in the form of a mirror, for example, reflects measuring beam M while maintaining the beam location, so that it retraces the same beam course again and after a third reflection at functional element 10, traversal of a third imaging element 11.3 having imaging factor $m_3 = m_1 = -1$ (retroreflection) and a fourth reflection at functional element 10, emerges again without location and directional shear.

Further symmetrical solutions may be found for N>3:
N=3, 5, 7, . . . :
  $m_n$=−1 for n=1, 2, . . . (N−1)/2, (N−1)/2+2, (N−1)/+3, . . . N,
  $m_n$=+1 for n=(N−1)/2+1
N=3, 6, 9, . . . :
  $m_n$=−1 for n=1, 3, 4, 6, 7, 9, . . . N,
  $m_n$=+1 for n=2, 5, 8, . . . N−1

Imaging elements 11.n are characterized here solely by their behavior in the case of small beam displacements Δx parallel to untilted functional element 10. Given an imaging factor m, emergent measuring beam M shifts in this plane by Δx'=m·Δx. Consequently, the behavior of the x-component of the k-vector in this plane is also established. Given a shift Δkx of incident measuring beam M, emergent measuring beam M shifts by Δkx'=Δkx/m. In this context, it is unimportant whether, due to the imaging element, emergent measuring beam M additionally undergoes a constant beam displacement or beam deviation. This means that the imaging elements may also be combined with deviating or beam-displacing optical components. Especially in the case of a plane-mirror interferometer having measuring beams impinging substantially perpendicularly, the beam displacement is an imperative prerequisite in order to separate beam paths and to allow only the beam course intended. Without such a beam displacement, measuring beam M would impinge again at the same beam location on the plane mirror or functional element 10, and could not be distinguished from measuring beam M striking the plane mirror or functional element 10 previously. Consequently, further reflections occur inevitably at the plane mirror or functional element 10, as well. Without beam displacement, a Fabry Perot interferometer would thus be obtained which, as is known, has no sinusoidal signal pattern as a function of the position of the plane mirror or functional element 10 and therefore is not able to be interpolated like an incremental measuring device. The beam displacement is therefore required. Because of that, all imaging elements of example embodiments of the present invention bring about a beam displacement between the incident and emergent beam of rays. For example, the beam cross-section may be larger than the beam cross-section of measuring beam M, in order to ensure a complete separation of the beams of rays. In principle, the direction of the beam displacement may be chosen freely. For example, this degree of freedom may be utilized to optimize the points of incidence of measuring beam M on the plane mirror or on functional element 10.

In principle, various optical elements may be used as imaging elements in the case of given imaging factor m. The following overview lists examples for suitable imaging elements without beam deviation having defined imaging factors m, which may be used in the measuring device hereof. Some of these imaging elements are shown in detail in FIGS. 7a to 7e.

| Imaging Factor | Imaging Element |
|---|---|
| m = +1 | Mirror |
|  | Grating-mirror-grating |
|  | beam-displacing reflecting prism |
| m = −1 | parabolic mirror |
|  | triple prism |
|  | triple mirror |
|  | lens-mirror-lens |
|  | (refractive or diffractive lenses with equal focal lengths) |
|  | Cat's-eye |
| m ≠ +1 and m ≠ −1 | lens-mirror-lens |
|  | (refractive or diffractive lenses with unequal focal lengths) |

| Imaging Factor | Imaging Element |
|---|---|
|  | two halves of parabolic mirrors having unequal focal lengths and common focal point |

Figures 7A, 7B, 7C, 7D:
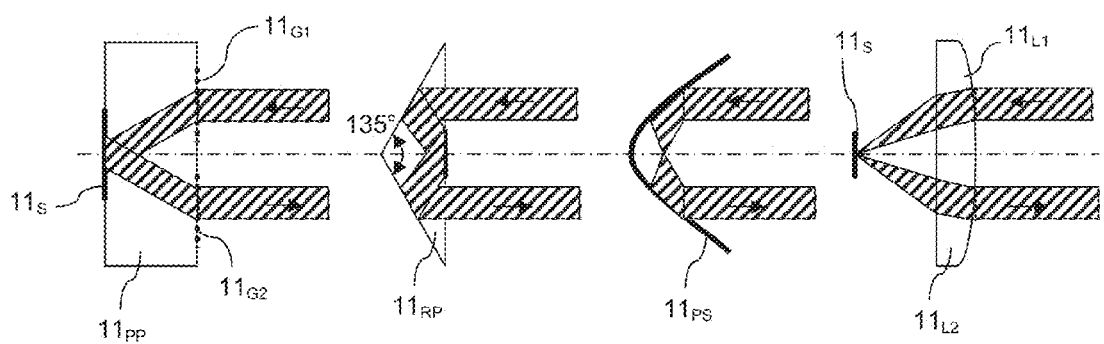
FIGS. 7a to 7e illustrate imaging elements.

FIG. 7a illustrates an imaging element having imaging factor m=+1 according to the variant "grating-mirror-grating" indicated above, in which the two gratings $11_{G1}$, $11_{G2}$ are disposed on one side and mirror $11_S$ is disposed on the opposite other side of a transparent plane plate $11_{PP}$.

FIG. 7b illustrates an imaging element having imaging factor m=+1, that is made of a reflecting prism $11_{RP}$, in which a reflection occurs at all three prism surfaces in succession. Such a reflecting prism is referred to hereinafter as a beam-displacing reflecting prism.

FIG. 7c illustrates an imaging element having imaging factor m=+1, that takes the form of a parabolic mirror $11_{PS}$.

FIG. 7d illustrates an imaging element having imaging factor m=−1 according to the variant "lens-mirror-lens" mentioned in the table, having two lenses $11_{L1}$, $11_{L2}$ and a mirror $11_S$.

Figure 7E:
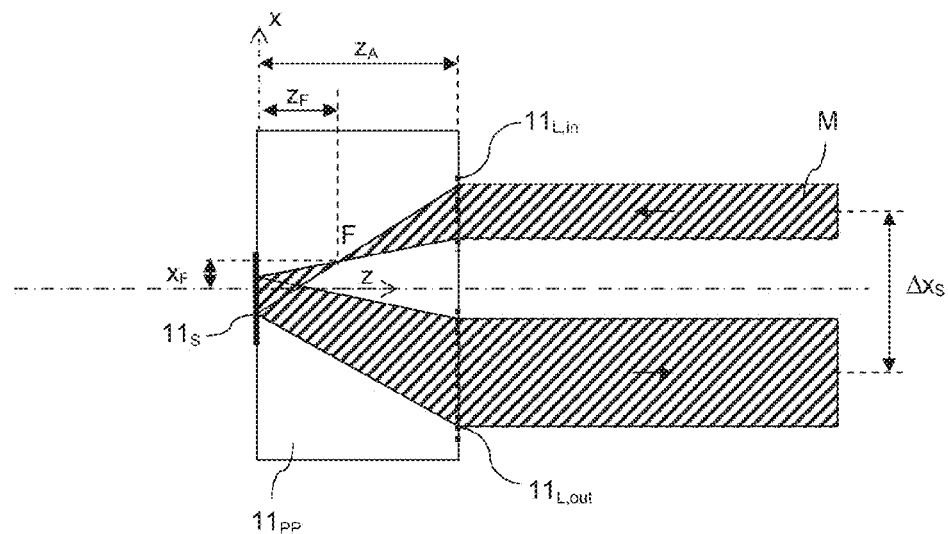

FIG. 7e illustrates an imaging element having imaging factor m=−2. It includes a first diffractive lens $11_{L,in}$, a mirror $11_S$, and a further second diffractive lens $11_{L,out}$, the two diffractive lenses $11_{L,in}$ $11_{L,out}$ and mirror $11_S$ being disposed on opposite sides of a transparent plane plate $11_{PP}$, similar to the variant illustrated in FIG. 7a.

In this case, the two lenses $11_{L,in}$, $11_{L,out}$ have different focal lengths and are arranged such that a collimated sub-beam falling on first lens $11_{L,in}$, after passing through second lens $11_{L,out}$, further propagates in collimated fashion again.

In the case of this imaging element, incident measuring beam M is focused by first diffractive lens $11_{L,in}$ into a focal point F at location ($x_F$, $z_F$), which at the same time is also the focal point of second diffractive lens $L_{11,out}$. If $f_{in}$ and $f_{out}$ denote the focal lengths of the two diffractive lenses $11_{L,in}$, $11_{L,out}$ in glass having refractive index $n_G$, then the following must hold true for the collimation of emergent measuring beam M:

$$f_{in}=z_A-z_F, f_{out}=z_A+z_F \qquad \text{(equation 13)}$$

Image scale m of this imaging element is represented by:

$$m = -\frac{f_{out}}{f_{in}} \qquad \text{(equation 14)}$$

Furthermore, a defined beam displacement $\Delta x_S$ should come about due to a suitable selection of $x_F$:

$$\frac{\frac{\Delta x_S}{2} - x_F}{f_{in}} = \frac{\frac{\Delta x_S}{2} + x_F}{f_{out}} \qquad \text{(equation 15)}$$

For predefined values for beam displacement $\Delta x_S$ and image scale m, the following conditions are satisfied:

$$f_{in} = \frac{2 \cdot z_A}{1-m} \qquad \text{(equation 16)}$$

-continued $$f_{out} = -\frac{2 \cdot m \cdot z_A}{1-m} \quad \text{(equation 17)}$$

$$x_F = \frac{\Delta x_S}{2} \cdot \frac{m+1}{m-1} \quad \text{(equation 18)}$$

The corresponding phase functions for the two diffractive lenses $11_{L,in}$, $11_{L,out}$ are expressed by the equations:

$$\Phi_{in}(x,y) = -k_0 \cdot n_G \cdot \sqrt{f_{in}^2 + (x-x_F)^2 + (y-y_F)^2} \quad \text{(equation 19)}$$

$$\Phi_{out}(x,y) = -k_0 \cdot n_G \cdot \sqrt{f_{out}^2 + (x-x_F)^2 + (y-y_F)^2} \quad \text{(equation 20)}$$

In this context, a beam displacement $\Delta y_S$ in the y-direction is also assumed, which leads to a shift $y_F$ of the focal point in the y-direction analogous to equation (18):

$$y_F = \frac{\Delta y_S}{2} \cdot \frac{m+1}{m-1} \quad \text{(equation 21)}$$

Such an imaging element may be provided for $m \ne -1$ and $m \ne +1$ only with the aid of lenses. Compared to triple prisms, lenses offer the advantage that measuring beam M is not impaired by facet edges, and therefore the wavefronts remain undisturbed. In principle, however, triple prisms or triple mirrors may be used as imaging elements in the case of $m=-1$, as well. The case of $m=+1$ corresponds to a simple reflection by mirror without lenses ($f_{in}$, $f_{out} \to \infty$ and $\phi_{in}$, $\phi_{in} \to$ const). In the case of imaging elements having lenses, in addition to diffractive lenses, refractive lenses, especially aspherical lenses, may also be used.

Interferential Position-Measuring-Device with a Measuring Standard

The avoidance of directional and location shears of the split sub-beams is also advantageous for measuring devices taking the form of interferential position-measuring devices with a measuring standard. This is explained in more detail below with reference to FIG. 8. In such position-measuring devices, two sub-beams are produced by suitable beam splitting. They are referred to hereinafter as sub-beam A and sub-beam B. After the splitting, sub-beams A, B traverse different beam paths and are ultimately brought to interference. In this case, the two sub-beams A, B are guided via a measuring standard, acting here as optical functional element 20, whose location or position is to be determined. The measuring standard is usually made of a grating which is periodic in the measuring direction.

In the event that the measuring standard tilts about any axis in the measuring-standard plane, two cases must be differentiated. In the case of a transmitted-light measuring standard, in general, the deviation of transmitted sub-beams A, B caused by the tilting is so slight that it may be disregarded. On the other hand, if an incident-light measuring standard is tilted correspondingly, the resulting deviation of sub-beams A, B is substantially greater. However, given the customary symmetrical beam paths, both sub-beams A, B are deviated nearly the same, so that upon superposition, only one common shift in location and direction of sub-beams A, B occurs, but not a location and directional shear of sub-beams A, B relative to each other. However, in the event that the measuring standard tilts about an axis perpendicular to the measuring-standard plane, that is, in the case of what is referred to as a moiré tilting, there is a location and directional shift of sub-beams A, B in opposite directions. In the case of conventional interferential position-measuring devices without a retroreflector, this leads to a location and directional shear of sub-beams A, B. In conventional interferential position-measuring devices with a retroreflector, the directional shear is able to be avoided; only a location shear of sub-beams A, B occurs.

In order to prevent both location and directional shears of sub-beams A, B simultaneously, according to example embodiments of the present invention, suitably formed imaging elements are again inserted between the respective impingements on the optical functional element in these measuring devices, as well. In the present case of the interferential position-measuring devices, the individual diffractions of sub-beams A, B at the measuring standard represent the impingement on the functional element. This is illustrated schematically in FIG. 8 in an xy-plane parallel to functional element 20 or the measuring standard. A beam of rays $B_{in}$ falling perpendicularly onto functional element 20 is diffracted or split at functional element 20, i.e., the measuring standard a first time into a $+1^{st}$ and $-1^{st}$ order of diffraction. Sub-beams A, B resulting via this beam splitting then in each case propagate to first imaging elements $12.1_A$ and $12.1_B$ having imaging factors $m_{A1}$ and $m_{B1}$, respectively, arrive back at functional element 20 and are then deviated again, in each instance in the same $+1^{st}$ and $-1^{st}$ order of diffraction. In the further beam path, in each case N further imaging elements $12.n_A$ and $12.n_B$ with $n=2 \ldots N$ and imaging factors $m_{An}$ and $m_{Bn}$, respectively, are traversed in succession, in between, in each instance a diffraction taking place once more at functional element 20 in the same $1^{st}$ and $-1^{st}$ order of diffraction, respectively. After an (N+1)th diffraction at functional element 20, the two sub-beams A, B are superposed in collinear fashion to form one beam of rays $B_{out}$ and emerge perpendicularly with respect to functional element 20. Phase-encoded measuring signals or position-dependent scanning signals are generated from the interfering pair of sub-beams A, B with the aid of a downstream detector system.

Figure 8:
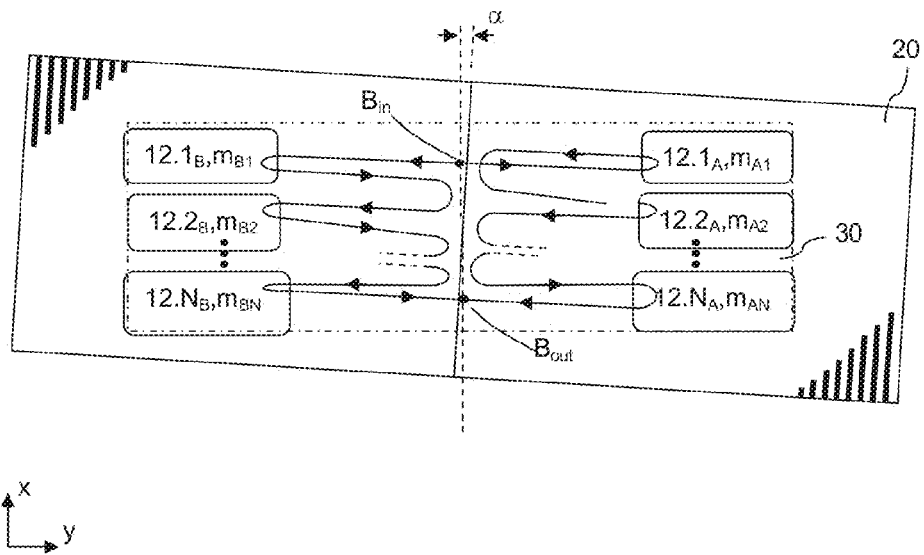
FIG. 8 schematically illustrates a scanning beam path in a measuring device according to an example embodiment of the present invention taking the form of an interferential position-measuring device with a measuring standard.

As illustrated in FIG. 8, in each instance, the two sub-beams A, B are split and superposed by a diffraction at the measuring standard or functional element 20, that is, functional element 20 in the form of a measuring standard acts here simultaneously as splitting and recombination element. Alternatively, however, these functions may likewise be assumed by a separate splitting element and/or a separate recombination element in scanning unit 30 as schematically illustrated. Suitable scanning gratings are used advantageously for this purpose.

Optimal image scales $m_{An}$ and $m_{Bn}$ of imaging elements $12.n_A$ and $12.n_B$ utilized may again be calculated with the aid of ray-tracing methods. In so doing, symmetrical solutions where $m_{An} = m_{Bn} = m_n$ are considered advantageous. In the case of an interferential position-measuring device having a functional element in the form of a measuring standard, one may limit oneself to dimensions x, z parallel to line direction x of the measuring standard or functional element 20 and perpendicular to functional element 20, since a moiré tilting causes, in linear approximation, only a beam movement in line direction x of functional element 20. In this coordinate system, the measuring direction of the position-measuring device extends along the y-axis which is oriented perpendicularly to line direction x of functional element 20.

Each beam-path segment of sub-beams A, B is described again according to equation (2) above by a suitably simplified ray vector $\vec{s}$, first component x describing only the shift of the beam location and second component kx only the change of the k-vector in the x-direction due to a moiré tilting α of the measuring standard or functional element 20. Instead of equation (3), the following results in linear approximation in the present case:

$$\vec{s}_{1A} = \vec{s}_{0A} + \begin{pmatrix} 0 \\ +\alpha \cdot k_G \end{pmatrix}, \quad \text{(equation 22)}$$

$$\vec{s}_{1B} = \vec{s}_{0B} + \begin{pmatrix} 0 \\ -\alpha \cdot k_G \end{pmatrix}$$

In this context, $k_G$ denotes grating vector $k_G = 2\pi/d_M$ of the measuring standard of functional element 20, and $d_M$ denotes grating period $d_M$ of the measuring standard. Ray vector $\vec{s}_{0A}$ or $\vec{s}_{1A}$ describes sub-beam A falling on or emerging from functional element 20. Analogously, ray vectors $\vec{s}_{0B}$ and $\vec{s}_{1B}$, respectively, describe the corresponding beam-path segments of sub-beam B.

If the splitting of sub-beams A, B is carried out by functional element 20, then $\vec{s}_{0A} = \vec{s}_{0B} = \vec{s}_0$ is true. The propagation over scanning distance D, measured in the z-direction, between functional element 20 and imaging elements 12.$n_A$ and 12.$n_B$ of scanning unit 30 leads to a shift Lx of the beam location, which is a function of the x-component of the k-vector:

$$\Delta x = \frac{k_x}{k_z} \cdot D = \frac{k_x}{k_0} \cdot \frac{k_0}{k_z} \cdot D = \frac{k_x}{k_0} \cdot \frac{D}{\cos(\beta)} \quad \text{(equation 23)}$$

In this context, angle β represents the beam tilt of sub-beams A, B in relation to optical axis z, which exists in rated mounting of the position-measuring device without tilting of functional element 20.

Consequently, the following results analogous to equation (4) above, where γ=A or B:

$$\vec{s}_{2\gamma} = \begin{pmatrix} 1 & \frac{D}{k_0 \cdot \cos(\beta_1)} \\ 0 & 1 \end{pmatrix} \cdot \vec{s}_{1\gamma} \quad \text{(equation 24)}$$

Equations (5) and (6) must be substituted accordingly:

$$\vec{s}_{3\gamma} = \begin{pmatrix} m_1 & 0 \\ 0 & \frac{1}{m_1} \end{pmatrix} \cdot \vec{s}_{2\gamma} \quad \text{(equation 25)}$$

$$\vec{s}_{4\gamma} = \begin{pmatrix} 1 & \frac{D}{k_0 \cdot \cos(\beta_3)} \\ 0 & 1 \end{pmatrix} \cdot \vec{s}_{3\gamma} \quad \text{(equation 26)}$$

Beam tilts $\beta_n$ may be different for each propagation from functional element 20 to scanning unit 30 and back.

The further beam path illustrated in FIG. 8 is described correspondingly by further transformations analogous to equations (22), and (24) to (26), so that equations (22) and (24) to (26) are used a total of N−1 times, in each instance with altered imaging factor $m_n$:

$$\vec{s}_{5\gamma} = \vec{s}_{4\gamma} + \begin{pmatrix} 0 \\ \pm\alpha \cdot k_G \end{pmatrix}, \quad \text{(equation 27)}$$

$$\vec{s}_{6\gamma} = \begin{pmatrix} 1 & \frac{D}{k_0 \cdot \cos(\beta_5)} \\ 0 & 1 \end{pmatrix} \cdot \vec{s}_{5\gamma},$$

$$\vec{s}_{7\gamma} = \begin{pmatrix} m_2 & 0 \\ 0 & \frac{1}{m_2} \end{pmatrix} \cdot \vec{s}_{6\gamma},$$

$$\vec{s}_{8\gamma} = \begin{pmatrix} 1 & \frac{D}{k_0 \cdot \cos(\beta_7)} D \\ 0 & 1 \end{pmatrix} \cdot \vec{s}_{7\gamma}$$

In this context, the plus sign is true for γ=A, and the minus sign is true for γ=B.

After the Nth diffraction at the measuring standard of functional element 20, ray vectors $\vec{s}_{(4N-2)A}$ and $\vec{s}_{(4N-2)B}$ are intended to be identical. Consequently, analogous to equation (8) above, the following must be true:

$$\vec{s}_{(4N-3)A} = \vec{s}_{(4N-3)B} \quad \text{(equation 28)}$$

For the case N=2 (diffraction three times at functional element 20, two imaging elements), analogous to equation (9), the following condition results from equation (28) for the corresponding position-measuring device:

$$\begin{pmatrix} \frac{2 \cdot \alpha \cdot D}{m_1 m_2} \cdot \frac{k_G}{k_0} \cdot \left( \frac{\frac{m_1^2 m_2^2}{\cos(\beta_1)} + \frac{m_2^2}{\cos(\beta_3)} +}{\frac{(1+m_1) \cdot m_2^2}{\cos(\beta_5)} + \frac{1+m_1}{\cos(\beta_7)}} \right) \\ 2 \cdot \alpha \cdot k_G \cdot \frac{1 + m_1 + m_1 m_2}{m_1 m_2} \end{pmatrix} = \begin{pmatrix} 0 \\ 0 \end{pmatrix} \quad \text{(equation 29)}$$

This leads to the following condition for $m_1$ (the solution $m_1 = -1$, $m_2 = 0$ must be ruled out):

$$m_1^2 \cdot \left( \frac{1}{\cos(\beta_7)} + \frac{1+m_1}{\cos(\beta_1)} \right) + \quad \text{(equation 30)}$$

$$(1 + m_1) \cdot \left( \frac{1}{\cos(\beta_3)} + \frac{1+m_1}{\cos(\beta_5)} \right) = 0$$

This third-order polynomial equation may be solved analytically. In general, the solutions are a function of angles $\beta_n$. If, in addition, for each sub-beam A and B, respectively, one calls for a beam path symmetrical with respect to the second diffraction at functional element 20, one obtains the additional conditions:

$$\beta_2 = \beta_1, \beta_5 = \beta_2 \quad \text{(equation 31)}$$

With these conditions, equation (30) provides, for example, the following solution:

$$m_1 = -2, m_2 = -\tfrac{1}{2} \quad \text{(equation 32)}$$

It agrees with equation (10) above, and is not a function of angles $\beta_n$.

For the case N=3 (diffraction four times at the measuring standard of functional element 20, three imaging elements), endless solutions are yielded from equation (27). If additionally, one calls for the following symmetry conditions:

$$\beta_{11}=\beta_1, \beta_9=\beta_3, \beta_7=\beta_5, m_3=m_1 \quad \text{(equation 33)},$$

one obtains, for example, the solution corresponding to equation (12):

$$m_1=m_2=-1, m_2=+1 \quad \text{(equation 34)}$$

Since in the case of a moiré tilting, in linear approximation, only a beam shift and tilt in line direction x of the measuring standard of functional element 20 occur, it is sufficient if imaging elements 12.1, 12.2, . . . 12.n have imaging factors $m_{nx}$ determined above only in this line direction x, i.e., perpendicular to measuring direction y of the position-measuring device. Both the same, but also other imaging factors $m_{ny}$ may be used in measuring direction y. In particular, it is considered advantageous to use only imaging factors $m_{ny}=\pm 1$ in measuring direction y. This means that roof prisms (m=1 in the roof-edge direction, m=−1 transversely thereto), a combination of a cylindrical lens, a mirror, and a cylindrical lens (m arbitrary in deflecting direction of the cylindrical lenses, m=+1 transversely thereto), or a combination of an astigmatic lens, a mirror, and an astigmatic lens (in each case arbitrary imaging factors in both directions) may also be used as imaging elements. When using cylindrical lenses, equations (19) and (20) must be modified accordingly. Should the deflecting direction of the cylindrical lenses extend along the x-direction, then:

$$\Phi_{in}(x,y)=-k_0 \cdot n_G \cdot \sqrt{f_{in}^2+(x-x_F)^2} \quad \text{(equation 35)}$$

$$\Phi_{out}(x,y)=-k_0 \cdot n_G \cdot \sqrt{f_{out}^2+(x-x_F)^2} \quad \text{(equation 36)}$$

When using astigmatic lenses, in good approximation, the following formulation may be selected:

$$\Phi_{in}(x, y) = \quad \text{(equation 37)}$$
$$-k_0 \cdot n_G \cdot \left( \frac{x^2}{x^2+y^2} \cdot \sqrt{f_{in,x}^2+(x-x_F)^2+(y-y_F)^2} + \frac{y^2}{x^2+y^2} \cdot \sqrt{f_{in,y}^2+(x-x_F)^2+(y-y_F)^2} \right)$$

$$\Phi_{out}(x, y) = \quad \text{(equation 38)}$$
$$-k_0 \cdot n_G \cdot \left( \frac{x^2}{x^2+y^2} \cdot \sqrt{f_{out,x}^2+(x-x_F)^2+(y-y_F)^2} + \frac{y^2}{x^2+y^2} \cdot \sqrt{f_{out,y}^2+(x-x_F)^2+(y-y_F)^2} \right)$$

with focal lengths $f_{in,x}$ and $f_{out,x}$ in the x direction and focal lengths $f_{in,y}$ and $f_{out,y}$ in the y direction. Due to the independent selection of the focal lengths in the x direction and y direction, imaging factors $m_x$ and $m_y$ may be determined separately for the two directions x and y with the aid of equations (13) to (18) and equation (21).

First Exemplary Embodiment

Figure 9A:
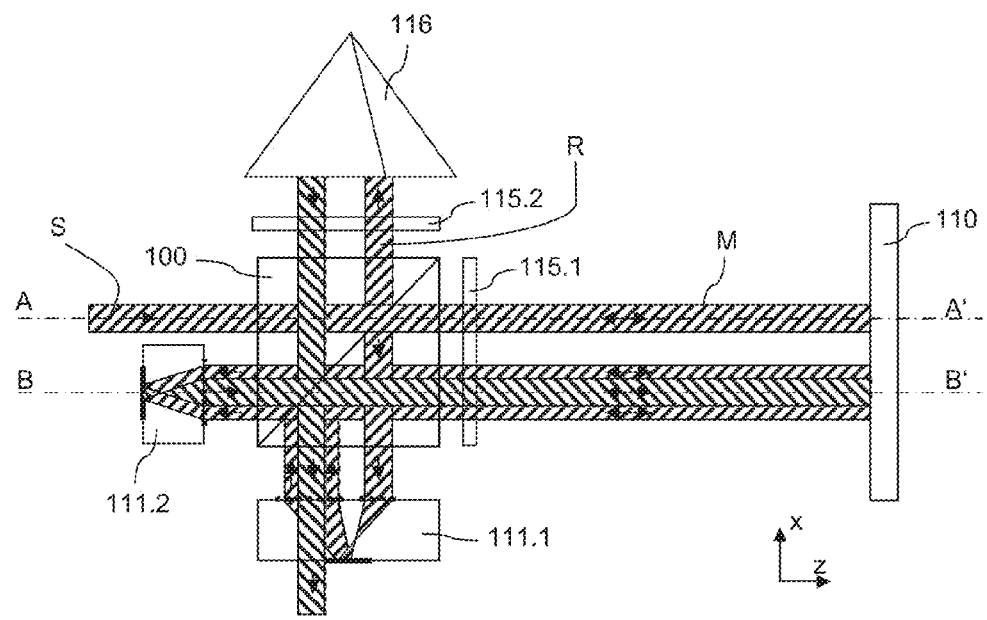
FIG. 9a schematically illustrates a complete beam path in a measuring device according to an example embodiment of the present invention in the form of a plane-mirror interferometer, in the xz plane.
Figure 9B:
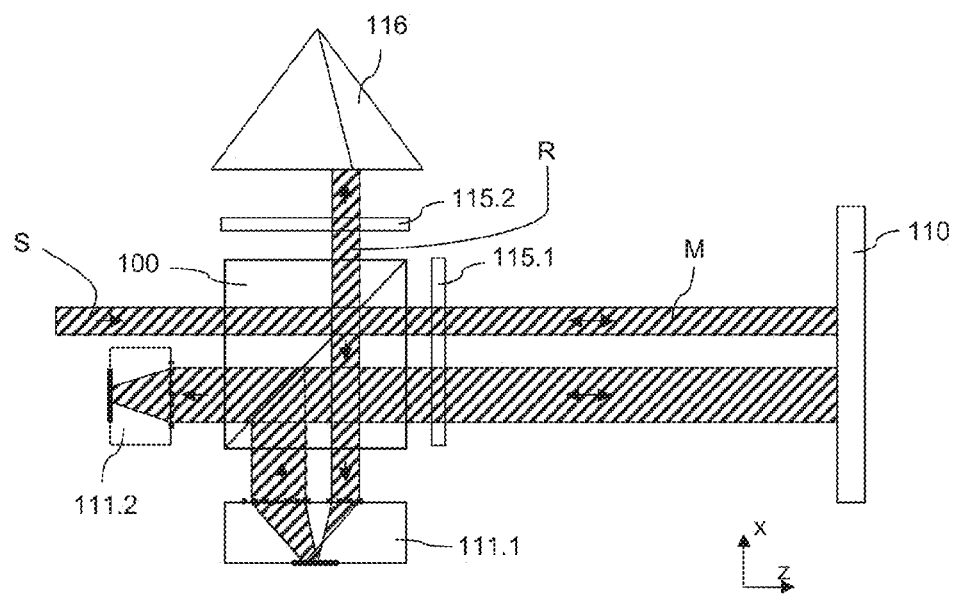
FIG. 9b schematically illustrates the beam path in the measuring device in a first xz plane.
Figure 9C:
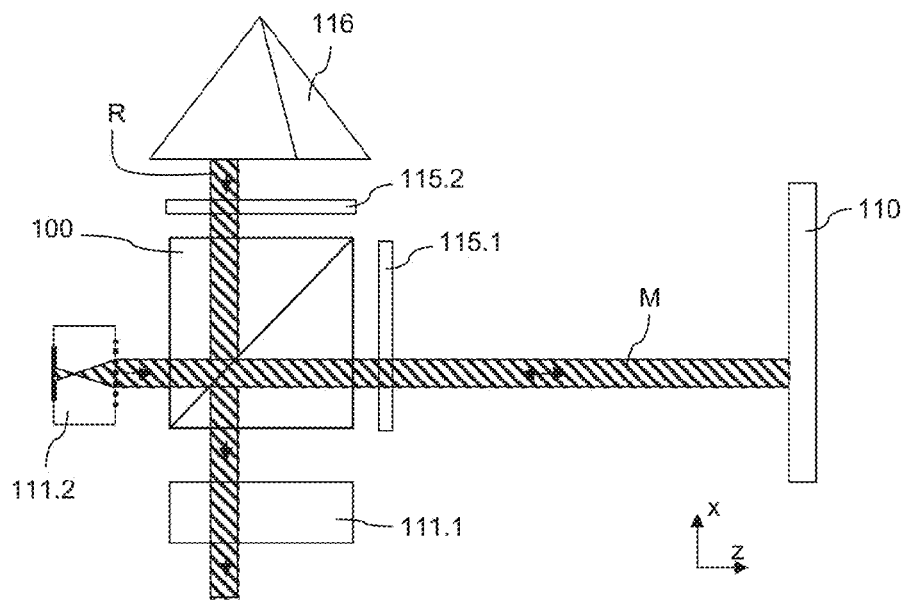
FIG. 9c schematically illustrates the beam path in the measuring device according in a second xz plane.
Figure 10A:
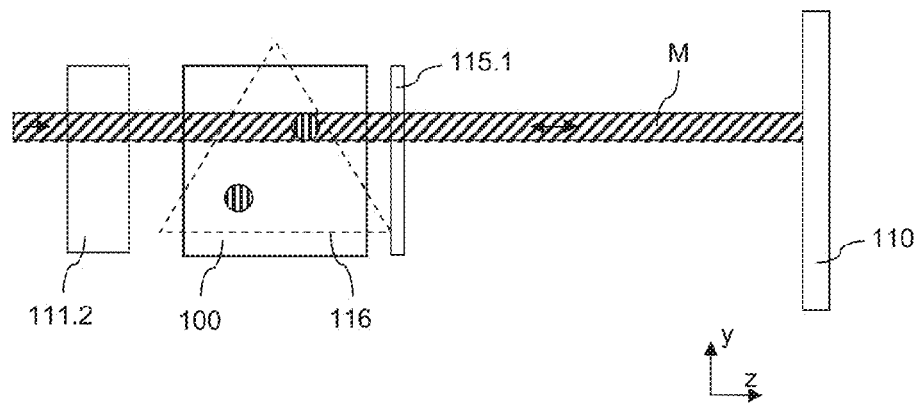
FIGS. 10a and 10b schematically illustrate the beam path in the measuring device according in different cross-sectional views.
Figure 10B:
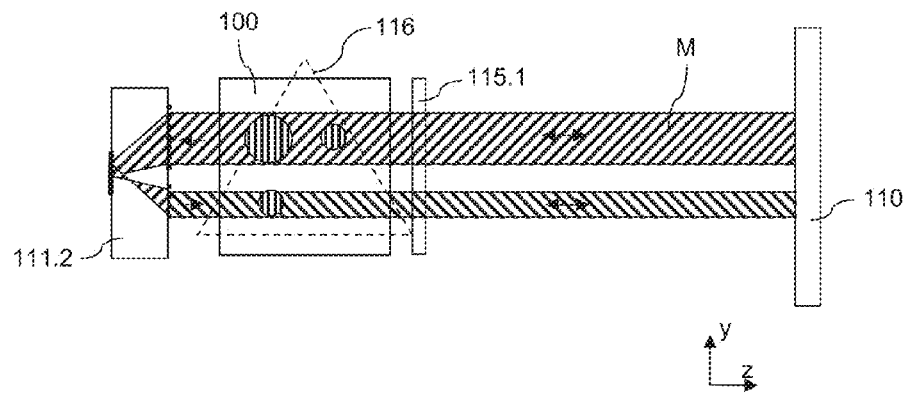

A measuring device according to a first exemplary embodiment of the present invention in the form of a plane-mirror interferometer having N=2 imaging elements is illustrated schematically in FIGS. 9a to 9c, 10a, and 10b. In this context, FIG. 10a is a cross-sectional view of the plane denoted by AA' in FIG. 9a, and FIG. 10b is a sectional view of the plane denoted by BB' in FIG. 9a.

With the aid of this measuring device, the distance of optical functional element 110, in the form of a plane mirror, along measuring direction z is determinable relative to the other components of the measuring device illustrated.

A linearly polarized beam of rays S emitted by a light source in the form of a laser propagates along the direction denoted by z to a splitting element 100. Splitting element 100 is in the form of a polarizing beam splitter having a suitable beam-splitter layer. The polarization direction of the light source is oriented at 45° relative to the indicated x direction. Splitting element 100 splits incident beam of rays S into two sub-beams, namely, a measuring beam M and a reference beam R.

Measuring beam M propagates further along the z direction, via a λ/4-plate 115.1, to optical functional element 110 in the form of a plane mirror whose position along the z direction is to be measured and upon which measuring beam M then falls perpendicularly. After impinging on the plane mirror for the first time and being reflected back, measuring beam M subsequently passes through λ/4-plate 115.1 a second time, so that it then has a polarizing direction rotated by 90°. Splitting element 100, that is, the polarizing beam splitter, then deviates measuring beam M in the −x direction and then guides it in the direction of a first imaging element 111.1 having an imaging factor $m_1=-2$. At the same time, first imaging element 111.1 shifts measuring beam M in the z direction. Following this, measuring beam M strikes the polarizing beam splitter of splitting element 100 again and is reflected in the direction of functional element 110, i.e., the plane mirror. After passing through λ/4-plate 115.1 again, the second reflection at the plane mirror, or more precisely, functional element 110 and the traversal of λ/4-plate 115.1 once more, the polarization of measuring beam M is rotated back again, so that measuring beam M then passes through the polarizing beam splitter of splitting element 100 without further deflection. Measuring beam M subsequently passes through second imaging element 111.2, which has imaging factor $m_2=-\frac{1}{2}$, is imaged by it and shifted in the y direction. The measuring beam then propagates via the polarizing beam splitter of splitting element 100 again to λ/4-plate 115.1 and to optical functional element 110, that is, the plane mirror. After a third reflection at the plane mirror and a further passage through λ/4-plate 115.1, measuring beam M is then deviated by the polarizing beam splitter of splitting element 100 and propagates to a detector system.

Reference beam R emerges from the polarizing beam splitter or splitting element 100 in the +x direction and impinges, via a λ/4-plate 115.2, on a retroreflector element 116 in the form of a triple prism. The triple prism is aligned or positioned such that reference beam R strikes none of its edges. Retroreflector element 116 reflects reference beam R falling on it back in the direction of splitting element 100. In so doing, retroreflector element 116 shifts reference beam R in the y direction and z direction such that subsequently, no beam displacement comes about between measuring beam M and reference beam R. After a further passage through λ/4-plate 115.2, reference beam R has a polarization rotated by 90°, so that it subsequently passes through the polarizing beam splitter of splitting element 100 without deflection and is then superposed, collinearly with measuring beam M. The superposed beams of rays are polarized perpendicularly relative to each other and then propagate to the detector system. There, phase-encoded measuring signals, e.g., in the form of three signals phase-shifted by 120°, are generated in, e.g., conventional manner, from which a position value is derived.

The arrangement of the measuring device in the form of a plane-mirror interferometer ensures that, in response to a limited tilt of the plane mirror acting as functional element 110, no location and/or directional shear occurs between the two sub-beams used for the signal acquisition, i.e., between measuring beam M and reference beam R. Correspondingly great tilting tolerances may therefore be permitted for the plane mirror. Given optimal layout, in the case of identical beam cross-sections, these tilting tolerances may well be ten times greater than for conventional plane-mirror interferometers.

This is ensured by the use of suitable imaging elements 111.1, 111.2 in the beam path of measuring beam M, which have imaging factors $m_1=-2$, $m_2=-\frac{1}{2}$ indicated above. As illustrated, they are arranged as lens-mirror-lens systems, as explained above with reference to FIG. 7e, for example.

It should be understood that the first exemplary embodiment may be modified without departing from the spirit and scope hereof.

Thus, for example, instead of the retroreflector element in the form of a triple prism for reflecting the reference beam, it is possible to provide an optical imaging element as a retroreflector element that has imaging factor $m_{Ref}=-1$. For example, the imaging elements mentioned in the table above for imaging factor $m=-1$ would be suitable for this purpose.

Moreover, the beam displacements of imaging elements 111.1, 111.2 in the two transverse directions y, z or x, y may be selected within wide limits, etc.

Second Exemplary Embodiment

Figure 11:
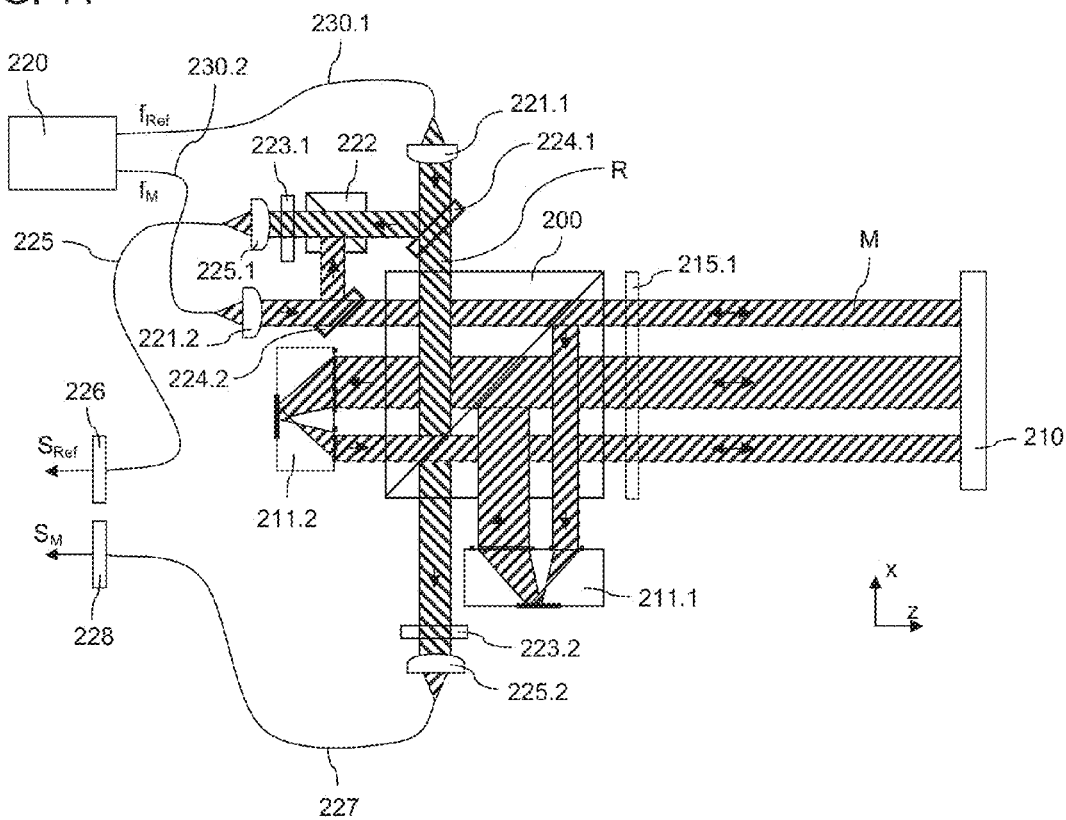
FIG. 11 schematically illustrates a complete beam path in a measuring device according to an example embodiment of the present invention in the form of a plane-mirror interferometer, in the xz plane.

A measuring device according to a second exemplary embodiment of the present invention in the form of a heterodyne plane-mirror interferometer is schematically illustrated in FIG. 11. Reflection of measuring beam M at optical functional element 210 three times, as well as N=2 imaging elements 211.1, 211.2, which are traversed between the three reflections taking place, are provided.

A light source 220, e.g., a laser, supplies two beams of rays having frequencies $f_M$ and $f_{Ref}$. These beams of rays, which differ in frequency, act in the present exemplary embodiment as measuring beam M and as reference beam R. Thus, a beam of rays emitted by the light source is not split via a splitting element separate from the light source. The generation of the two sub-beams, i.e., measuring beam M and reference beam R, is assumed by the suitably designed light source. The differential frequency $\Delta f=f_M-f_{Ref}$ of the frequencies of measuring and reference beams M, R is selected such that a correspondingly modulated optical signal is detectable by fast photodetectors. For example, a frequency-stabilized fiber laser or HeNe laser may produce measuring beam M having frequency $f_M$, of which a part is split off and frequency-shifted by an acousto-optical modulator (AOM) by the frequency $\Delta f$. This part furnishes reference beam R having frequency $f_{Ref}$.

Both sub-beams M, R are guided separately via optical fibers 230.1, 230.2 in the form of polarization-maintaining monomode fibers, to the plane-mirror interferometer. There, they are each collimated via collimating optics 221.1, 221.2 and adjusted in polarization such that they are perpendicular relative to each other. In each instance, a part of sub-beams M, R is split off via partially-transmitting mirrors 224.1, 224.2 and superposed via a beam-recombination element 222, so that after passing through a polarizer 223.1, they are able to interfere. The superposed beam of rays is coupled by a coupling-in lens 225.1 into an optical fiber 225 in the form of a single-mode fiber and supplied to a detector 226 which delivers a corresponding reference signal $S_{Ref}$ modulated with frequency $\Delta f$. The phase of reference signal $S_{Ref}$ is used as reference phase $\phi_{Ref}$.

Comparable to the first exemplary embodiment, measuring beam M having frequency $f_M$ passes through the various optical components of the measuring device as follows: splitting element 200 in the form of a polarization-optical beam splitter; $\lambda/4$-plate 215.1; functional element 210 in the form of a plane mirror; $\lambda/4$-plate 215.1; imaging element 211.1, imaging factor $m_1=-2$; splitting element 200; $\lambda/4$-plate 215.1; functional element 210; $\lambda/4$-plate 215.1; splitting element 200; imaging element 211.2, imaging factor $m_2=-\frac{1}{2}$; splitting element 200; $\lambda/4$-plate 215.1; functional element 210; $\lambda/4$-plate 215.1; splitting element 200.

Following this, measuring beam M strikes a polarizer 223.2.

Reference beam R passes through splitting element 200, in so doing, is superposed collinearly with measuring beam M after its third reflection back by functional element 210 and likewise arrives at polarizer 223.2, which brings the two beams of rays to interference. Since because of the measures described herein, the superposed beam of rays changes neither its location nor its direction even in the event functional element 210, i.e., the plane mirror tilts, it may be coupled via a coupling-in lens 225.2 into a further optical fiber 227 in the form of a single-mode fiber. Optical fiber 227 transmits the superposed beam of rays to detector 228. Generated signal $S_M$ in turn furnishes a signal, modulated by differential frequency $\Delta f$, whose phase $\phi_M$ is determined. In, e.g., conventional manner, phase difference $\phi_M-\phi_{Ref}$ furnishes the position of functional element 210 movable along the z direction. Transmitting the superposed beam of rays in optical fiber 227 in the form of a single-mode fiber ensures a very constant transit time which, in contrast to an electrical transmission or an optical transmission in a multi-mode fiber, is very constant and not dependent on the bending of the transmission cable.

In this exemplary embodiment, all beams of rays take a course in one common xz plane, which coincides with the drawing plane. Measuring beams M falling perpendicularly upon functional element 210, i.e., the plane mirror, are located on one line. For this reason, the extension of functional element 210 or the plane mirror in the y direction, i.e., perpendicular to the drawing plane, may be selected to be correspondingly small.

Splitting element 200 is used both in the first and in the present second exemplary embodiment to separate the beams of rays reflected back by the plane mirror or functional element 210, from the beams of rays propagating, collinearly to the plane mirror. In the first exemplary embodiment, the splitting element is also used to split the beam of rays emitted by the light source, into the measuring beam and reference beam. As already mentioned above, in the second exemplary embodiment, measuring and reference beams having different frequencies are generated by a suitably designed light source. Moreover, in both exemplary embodiments, the splitting element has the function of superposing the measuring beam and the reference beam again. Alternatively, all these functionalities may be distributed over several splitting elements, that is, it is not imperative that only one splitting element be provided.

Third Exemplary Embodiment

In FIG. 12, a third exemplary embodiment of a measuring device according to the present invention in the form of a plane-mirror interferometer is schematically illustrated. In this variant, four reflections of measuring beam M at functional element 310, or more precisely, the plane mirror, and N=3 imaging elements are now provided. In this connection, a first and a third imaging element are integrated together in a single imaging element 311.1. Separate from that, a further second imaging element 311.2 is provided. The two imaging elements integrated in imaging element 311.1 have imaging factors $m_1=m_3=-1$ and act like a triple prism on measuring beam M falling on them. The further second imaging element 311.2 has an imaging factor $m_2=+1$ and acts as a grating-mirror-grating combination according to FIG. 7a or as a beam-displacing reflecting prism according to FIG. 7b on the measuring beam falling on it.

In this exemplary embodiment, the beam path proceeds in two xz planes located one upon the other. The beam paths in the different planes are illustrated in FIG. 12 with different cross-hatchings and a small beam offset used only for better illustration. Actually, the corresponding beam paths are located exactly one upon the other.

A beam of rays S, emitted by a light source 320 in the form of a laser, for example, is supplied via a monomode fiber 330 in the upper beam-path plane to the plane-mirror interferometer and collimated by collimating optics 321. The polarization direction of this beam of rays S is at 45° relative to the two axes of a splitting element 300 in the form of a polarizing beam splitter. It splits beam of rays S into a measuring beam M and a reference beam R. Following this, measuring beam M propagates via a $\lambda/4$-plate 315.1 to functional element 310, i.e., the plane mirror, and after being reflected back and a further passage through $\lambda/4$-plate 315.1, is deviated by splitting element 300 in the direction of imaging element 311.1. Imaging element 311.1 takes the form of a triple prism. A first imaging element integrated in it images measuring beam M and shifts it into the lower beam-path plane. There, measuring beam M is deviated again by splitting element 300, i.e., the polarizing beam splitter, and strikes a second time, via $\lambda/4$-plate 315.1, on the plane mirror of functional element 310. After being reflected again and a further passage through $\lambda/4$-plate 315.1, it arrives, without deviation by splitting element 300, at further imaging element 311.2 which is in the form of a reflecting prism according to FIG. 7b. Besides imaging with imaging factor $m_2=+1$, imaging element 311.2 shifts measuring beam M into the upper beam-path plane. Following that, measuring beam M passes through splitting element 300 again without deviation and strikes a third time, via $\lambda/4$-plate 315.1, on the plane mirror of functional element 310. After a third reflection, it arrives via $\lambda/4$-plate 315.1 back at splitting element 300, which deviates it to the other imaging element in imaging element 311.1. This imaging element shifts measuring beam M into the lower beam-path plane again. It is deviated once more at splitting element 300 and propagates via $\lambda/4$-plate 315.1 a fourth time to functional element 310, or rather, the plane mirror. After being reflected back the fourth time and a further passage through $\lambda/4$-plate 315.1, measuring beam M finally passes through splitting element 300 without deviation.

Reference beam R resulting at splitting element 300 after the splitting of beam of rays S is shifted via a reference retroreflector 316 into the lower beam-path plane and superposed collinearly by the polarizing beam splitter of splitting element 300 with measuring beam M after the fourth reflection back at functional element 310. In the process, measuring beam M and reference beam R are polarized perpendicularly relative to each other. The superposed beams of rays are split by a grating 329 into a $0^{th}$, $+1^{st}$ and $-1^{st}$ order of diffraction and focused by a lens 331 onto corresponding detectors 328.1, 328.2, 328.3 of a detector system. Polarizers 323.1, 323.2, 323.3 located in front of them permit, in, e.g., a conventional manner, the adjustment of a phase shift of, in each instance, 120° between phase-encoded measuring signals $S_0$, $S_{120}$ and $S_{-120}$ generated.

In this exemplary embodiment of the measuring device, as well, imaging elements 311.1, 311.2 ensure that tilting of functional element 310 leads neither to a location nor to a directional shear between superposed measuring and reference beams M, R.

Fourth Exemplary Embodiment

A measuring device according to a fourth exemplary embodiment of the present invention is schematically illustrated in FIGS. 13a, 13b, and 14. It is in the form of an interferential position-measuring device having a measuring standard. In this exemplary embodiment, the measuring standard acts as optical functional element 410 which is impinged upon three times by sub-beams A, B used for the signal acquisition, in each case a diffraction of sub-beams A, B resulting. Between the impingements on the measuring standard, in each case N=2 imaging elements are traversed by sub-beams A, B.

In this case, functional element 410, i.e., the measuring standard, is movable at least along measuring direction y relative to the remaining components of the measuring device. With the aid of the measuring device, scanning signals are determined with respect to the relative position of functional element 410 along measuring direction y.

FIG. 13a illustrates the beam path of an incident beam of rays S and the beam paths of sub-beams A, B resulting after the splitting, up to the second impingement on functional element 410. Illustrated to the right in FIG. 13b is the beam path of sub-beams A, B as of the second impingement on functional element 410 up to the third impingement on it and the recombination of sub-beams A, B. FIG. 14 illustrates the scanning beam path in another view.

In this case, the first imaging element, which is traversed by sub-beam A after the splitting of beam of rays S at functional element 410, includes a first diffractive lens 412.$A_{L1}$, a first mirror 412.$A_{R1}$, and a second diffractive lens 412.$A_{L2}$ which, as illustrated, are disposed on the upper side and lower side of a transparent plane plate 413. A third diffractive lens 412.$A_{L3}$, a second mirror 412.$_{R2}$, and a fourth diffractive lens 412.$A_{L4}$ form the second imaging element which is traversed by sub-beam A between the second and third impingement on functional element 410. Analogous to that, the two corresponding imaging elements of sub-beam B include a first diffractive lens 412.$B_{L1}$, a first mirror 412.$B_{R1}$ and a second diffractive lens 412.$B_{L2}$, as well as a third diffractive lens 412.$B_{L3}$, a second mirror 412.$B_{R2}$, and a fourth diffractive lens 412.$B_{L4}$, respectively, on the upper side and lower side of plane plate 413.

The imaging factor of the first imaging elements which are traversed initially by sub-beams A, B amounts to $m_{1x}=-2$ in line direction x of functional element 410, that is, of the measuring standard, and $m_{1y}=+1$ in measuring direction y. The imaging factor of the second imaging elements is $m_{2x}=-\frac{1}{2}$ in line direction x and $m_{2y}=+1$ in measuring direction y.

Beam of rays S emitted by a light source, e.g., a laser, is split at functional element 410, that is, at the measuring standard, into a $+1^{st}$ and $-1^{st}$ order of diffraction. The $+1^{st}$ order of diffraction propagates subsequently as sub-beam A through the first imaging element, is diffracted a second time in the $+1^{st}$ order of diffraction at functional element 410, and then passes through the second imaging element. A third diffraction in the $+1^{st}$ order of diffraction at functional element 410 deflects sub-beam A again along optical axis z.

The beam path of sub-beam B, symmetrical with respect to the xz plane, is determined by the assigned first and second imaging elements. In this context, a diffraction of sub-beam B in the $-1^{st}$ order of diffraction results three times at functional element 410.

Upon the third diffraction at functional element 410, both sub-beams A and B are superposed collinearly without beam displacement and strike a detector system, which delivers corresponding phase-encoded measuring signals. Not shown in the figures for reasons of better clarity are polarization elements such as polarizers and $\lambda/4$- or $\lambda/2$-plates in the beam path of sub-beams A and B, which are used to polarize them orthogonally relative to each other.

A particular advantage of this interferential position-measuring device is that in the event of a moiré tilt about an axis in the z direction, no location and directional shears of the two sub-beams A, B relative to each other occur, and the moiré tilt tolerances are thereby markedly greater.

Fifth Exemplary Embodiment

Figure 16:
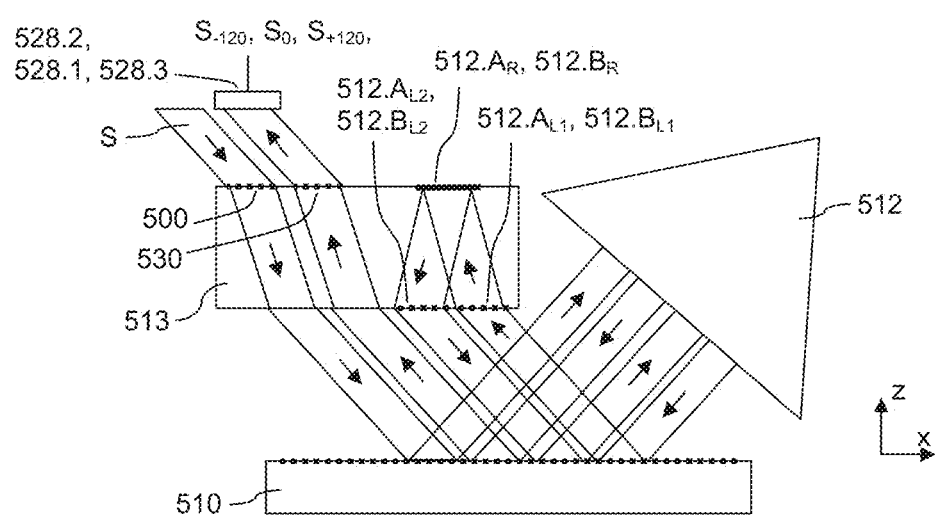
FIG. 16 is another view of the scanning beam path of the position measuring device illustrated in FIGS. 15a and 15b.

Analogous to the illustrations of the preceding exemplary embodiment, FIGS. 15a, 15b, and 16 illustrate a measuring device according to a fifth exemplary embodiment of the present invention which again takes the form of an interferential position-measuring device having a measuring standard. Optical functional element 510, i.e., the measuring standard utilized, is impinged upon or diffracted four times by sub-beams A, B used for the signal acquisition. Between the impingements on the measuring standard, in each case N=3 imaging elements are traversed by sub-beams A, B.

A triple prism that has imaging factors $m_1=m_3=-1$ is provided as first and third imaging element 512 traversed by sub-beams A, B. The traversed second imaging element for sub-beam A includes a combination of a grating 512.$A_{G1}$, a mirror 512.$A_R$, and a grating 512.$A_{G2}$, which are disposed on the upper side and lower side of a transparent plane plate 513. Analogous to that, the traversed second imaging element for sub-beam B includes a combination of a grating 512.$B_{G1}$, a mirror 512.$B_R$, and a grating 512.$B_{G2}$ on the upper side and lower side of transparent plane plate 513. The imaging factors of these second imaging elements are selected according to $m_2=+1$.

An incident beam of rays, inclined in the xz plane, is split by a splitting element 500 in the form of splitting grating $G_1$ on the upper side of plane plate 513 having grating constant $d_1$, into a −1st (sub-beam A) and $+1^{st}$ (sub-beam B) order of diffraction. Sub-beam A propagates to functional element 510, i.e., to the measuring standard. It has grating constant $d_{MG}=\frac{1}{2} d_1$ and brings about a first diffraction of the incident sub-beam into the $+1^{st}$ order of diffraction. Following this, sub-beam A passes through first imaging element 512 of the triple prism and thereby undergoes a retroreflection and a beam displacement in the x direction. It is thereupon deflected a second time at functional element 510 in the $+1^{st}$ order of diffraction, subsequently passes through the second imaging element and is thereby imaged as well as displaced in the x direction. Sub-beam A propagates again to functional element 510, or more precisely, the measuring standard, and is diffracted a third time in the $+1^{st}$ order of diffraction. After a further retroreflection and a beam displacement in the x direction by third imaging element 512 in the triple prism, and a fourth diffraction at the functional element in the $+1^{st}$ order of diffraction, sub-beam A finally arrives at a recombination element 530 in the form of a recombination grating on the upper side of plane plate 513.

After the analogous traversal of the three assigned imaging elements and the impingement four times on functional element 510, the beam path of sub-beam B, symmetrical with respect to the xz plane, strikes the same location on recombination element 530. The corresponding recombination grating has a grating constant $d_4=d_1$, superposes the two sub-beams A, B in collinear fashion and brings them to interference. By a suitable selection of the phase depth and the line-to-period ratio in the recombination grating of recombination element 530, three resulting orders of diffraction occur which are detected by downstream detectors 528.1, 528.2, 528.3 of the detector system and supply measuring signals $S_{-120}$, $S_0$ and $S_{+120}$ phase-shifted by 120° relative to each other.

Further Example Embodiments

Besides the exemplary embodiments described above, it should be understood that there are further example embodiments that do not depart from the spirit and scope hereof.

For example, in the case of the first three exemplary embodiments of the measuring device explained above, each of which takes the form of a plane-mirror interferometer, because of the impingement on the functional element or plane mirror three or multiple times and because of the selection of the imaging factors, the emergent measuring beam is kept stable in its location and its direction, that is, regardless of a possible tilting of the plane mirror in the measuring arm. In the case of a differential plane-mirror interferometer, the measures described herein may also be transferred to the beam path of the reference beam. In this manner, the reference beam may be kept stable in terms of location and direction even in the event of a possible tilting of the functional element or plane mirror in the reference arm.

The transmission of the superposed sub-beams via optical fibers, especially via single-mode fibers, to separate detectors, explained in connection with the second exemplary embodiment of the measuring device, may also be provided in measuring devices in the form of interferential position-measuring devices with a measuring standard. That is, the superposed sub-beams may be transmitted correspondingly from the scanning unit to a downstream detector system via optical fibers, especially via single-mode fibers, as well. The prerequisite in so doing is that the superposed sub-beams should be kept stable in terms of location and direction in line direction x and in measuring direction y. While this is given in linear approximation in the case of position-measuring devices having transmission measuring standards, when using reflection measuring standards, the imaging factors in the measuring direction must in addition also be selected according to the solutions described above. Only then—besides the suppressed location and directional shear—do the location and the direction of the superposed sub-beam also remain, regardless of a possible tilting of the measuring standard.

What is claimed is:

1. A measuring device for high-precision optical determination of distance and/or position, comprising:
   a light source;
   at least one optical functional element arranged as a plane mirror;
   two imaging elements; and
   a detector system;
   wherein the optical functional element is adapted such that at least one of at least two sub-beams impinges on the optical functional element three times before the sub-beams propagate, interferingly superposed, in a direction of the detector system, the detector system adapted to generate at least one phase-encoded measuring signal from the superposed sub-beams;

wherein between the impingements on the optical functional element, the sub-beam passes through the imaging elements, the imaging elements having imaging factors such that no location and directional shear of the interfering sub-beams results if the optical functional element tilts out of a setpoint position;

wherein the imaging elements are adapted to displace emergent sub-beams relative to incident beams of rays;

wherein for the imaging factors of a number of N imaging elements, the following conditions are satisfied:

$$N=2, m_1=-2, \text{ and } m_2=-\tfrac{1}{2}; \text{ and}$$

wherein n=1 . . . N and $m_n$ represents an imaging factor of an nth imaging element.

2. The measuring device according to claim 1, wherein the imaging elements include a lens and a mirror.

3. The measuring device according to claim 2, wherein the lens includes a diffractive lens.

4. The measuring device according to claim 2, wherein the imaging element includes two lenses that have different focal lengths and are adapted such that a collimated sub-beam falling on a first lens, after passing through a second lens, propagates further in collimated fashion again.

5. The measuring device according to claim 1, wherein the light source and/or a splitting element is adapted to split a beam of rays into the sub-beams.

6. The measuring device according to claim 1, further comprising at least one optical fiber adapted to transmit the interferingly superposed sub-beams to the detector system.

7. The measuring device according to claim 1, wherein the plane mirror is arranged in a measuring arm of an interferometer and is impinged on at least three times by a measuring beam.

8. The measuring device according to claim 7, wherein the measuring beam falls perpendicularly onto the plane mirror.

9. A measuring device for high-precision optical determination of distance and/or position, comprising:
   a light source;
   at least one optical functional element arranged as a measuring standard;
   two imaging elements; and
   a detector system;

wherein the optical functional element is adapted such that at least one of at least two sub-beams impinges on the optical functional element three times before the sub-beams propagate, interferingly superposed, in a direction of the detector system, the detector system adapted to generate at least one phase-encoded measuring signal from the superposed sub-beams;

wherein between the impingements on the optical functional element, the sub-beam passes through the imaging elements, the imaging elements having imaging factors such that no location and directional shear of the interfering sub-beams results if the optical functional element tilts out of a setpoint position;

wherein for the imaging factors of a number of N imaging elements, the following conditions are satisfied:

$$N=2, m_1=-2, \text{ and } m_2=-\tfrac{1}{2}; \text{ and}$$

wherein n=1 . . . N and $m_n$ resents an imaging factor of an nth imaging element.

10. The measuring device according to claim 9, wherein the imaging elements include a lens and a mirror.

11. The measuring device according to claim 10, wherein the lens includes a diffractive lens.

12. The measuring device according to claim 9, wherein the imaging element includes two lenses that have different focal lengths and are adapted such that a collimated sub-beam falling on a first lens, after passing through a second lens, propagates further in collimated fashion again.

13. The measuring device according to claim 9, wherein the light source and/or a splitting element is adapted to split a beam of rays into the sub-beams.

14. The measuring device according to claim 9, further comprising at least one optical fiber adapted to transmit the interferingly superposed sub-beams to the detector system.

15. The measuring device according to claim 9, wherein the measuring standard is impinged on at least three times by two sub-beams of an interferential position-measuring device.

16. The measuring device according to claim 9, wherein the imaging elements are adapted such that emergent sub-beams are displaced relative to incident sub-beams.

* * * * *